United States Patent
Hu et al.

(10) Patent No.: US 7,747,884 B2
(45) Date of Patent: Jun. 29, 2010

(54) POWER SUPPLY CIRCUIT FOR MOTHERBOARD

(75) Inventors: Ke-You Hu, Shenzhen (CN); Feng-Long He, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 369 days.

(21) Appl. No.: 11/958,397

(22) Filed: Dec. 18, 2007

(65) Prior Publication Data

US 2009/0085554 A1    Apr. 2, 2009

(30) Foreign Application Priority Data

Sep. 27, 2007    (CN) .................... 2007 1 0201878

(51) Int. Cl.
  *G06F 1/26* (2006.01)

(52) U.S. Cl. .................... 713/300; 323/275; 307/38

(58) Field of Classification Search ................. 713/300, 713/320–323, 340; 323/272–275, 282–284; 307/31, 38, 39, 64, 86
See application file for complete search history.

(56) References Cited

U.S. PATENT DOCUMENTS

| | | | |
|---|---|---|---|
| 3,963,974 A | | 6/1976 | Hess, Jr. |
| 5,086,500 A | * | 2/1992 | Greub ................ 713/401 |
| 5,268,845 A | * | 12/1993 | Startup et al. ......... 323/275 |
| 5,546,589 A | * | 8/1996 | Odaira ................ 713/340 |
| 5,585,792 A | * | 12/1996 | Liu et al. ............. 341/22 |
| 5,905,365 A | * | 5/1999 | Yeh ................... 320/166 |
| 6,198,262 B1 | * | 3/2001 | Squibb et al. .......... 323/273 |

* cited by examiner

*Primary Examiner*—Rajnikant B Patel
(74) *Attorney, Agent, or Firm*—Frank R. Niranjan

(57) ABSTRACT

A power supply circuit for a motherboard includes a first resistor, a second resistor, a Schottky diode, and a direct current (DC) voltage source. The Schottky diode includes a first anode, a second anode, and a cathode. The first anode of the Schottky diode is respectively coupled to terminals of the first and second resistors, another terminal of each of the first and second resistors is respectively coupled to a power supply and ground. The second anode of the Schottky diode is coupled to the DC voltage source, the cathode of the Schottky diode is coupled to a south bridge.

5 Claims, 1 Drawing Sheet

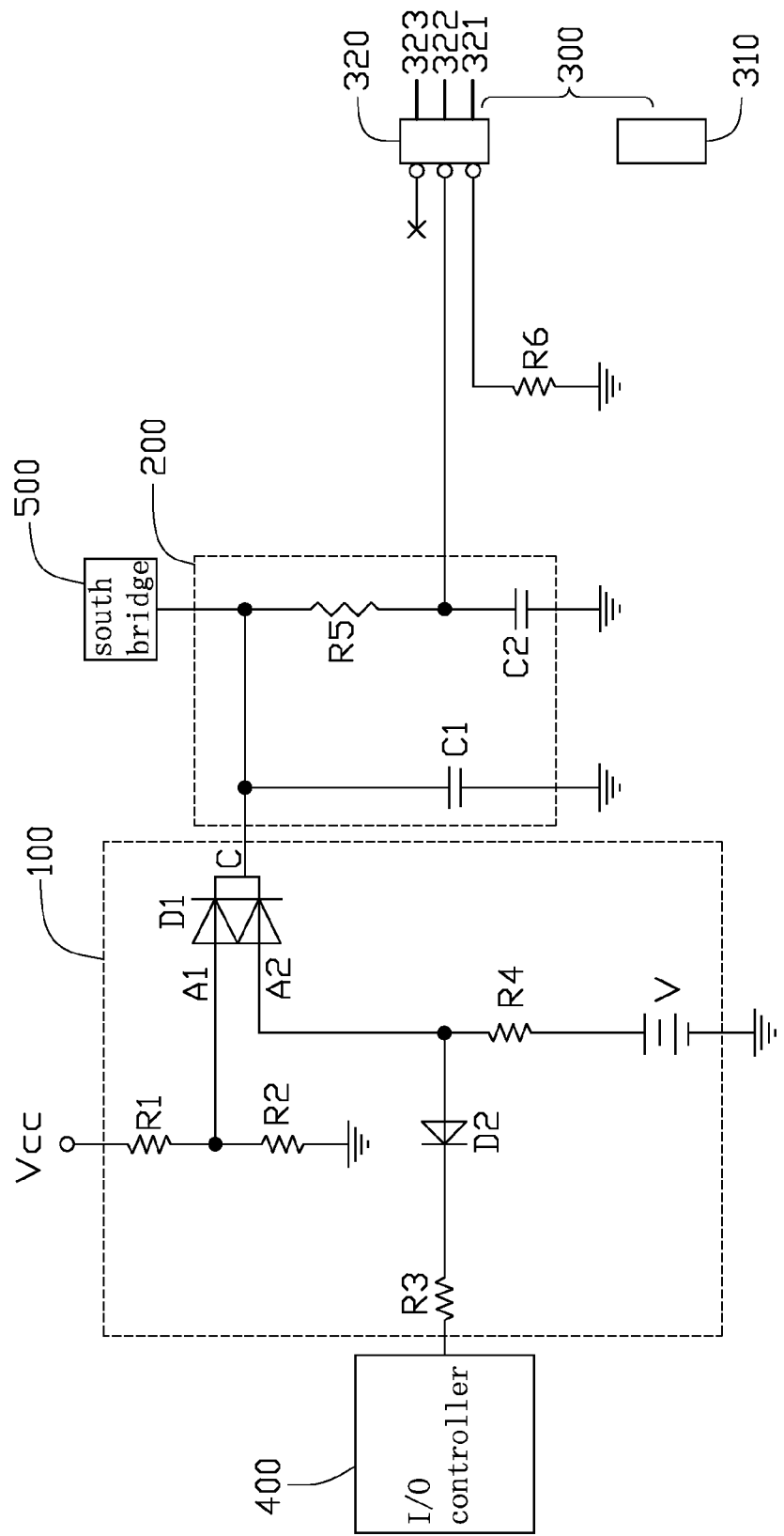

POWER SUPPLY CIRCUIT FOR MOTHERBOARD

BACKGROUND

1. Field of the Invention

The present invention relates to power supply circuits, and particularly to a power supply circuit for a motherboard in a computer.

2. Description of Related Art

In electronics and particularly in computer electronics, jumpers are typically used to set up or adjust printed circuit boards, such as the motherboards of computers. Jumper pins (points to be connected by the jumper) are arranged in groups called jumper blocks, each group having at least one pair of contact points and often more. In general, each contact in a jumper block terminates in a small metal pin. An appropriately sized conductive sleeve called a jumper, or more technically, a jumper shunt, is slipped over the pins to complete the circuit.

Jumper blocks and jumpers are often used on a motherboard to maintain power supply to a south bridge thus safeguarding CMOS information stored therein. Further, the jumpers may be moved to invoke a function to clear the CMOS information in the south bridge, and reset the BIOS configuration settings, which allows the computer to boot if a recent BIOS setting made it unable to boot, or if the CMOS boot password was forgotten. However, if the jumper falls off from the jumper blocks in the first case, a power supply circuit on the motherboard will not supply power to the south bridge, and the CMOS information in the south bridge may be lost.

What is needed, therefore, is to provide a power supply circuit for a motherboard which can avoid losing CMOS information in a south bridge thereof when a jumper falls off from a jumper block.

SUMMARY

An exemplary power supply circuit for a motherboard includes a first resistor, a second resistor, a Schottky diode, and a direct current (DC) voltage source. The Schottky diode includes a first anode, a second anode, and a cathode. The first anode of the Schottky diode is respectively coupled to terminals of the first and second resistors, another terminal of each of the first and second resistors is respectively coupled to a power supply and ground. The second anode of the Schottky diode is coupled to the DC voltage source, the cathode of the Schottky diode is coupled to a south bridge.

Other advantages and novel features of the present invention will become more apparent from the following detailed description of preferred embodiment when taken in conjunction with the accompanying drawing, in which:

BRIEF DESCRIPTION OF THE DRAWING

The drawing is a circuit diagram of an embodiment of a power supply circuit for motherboard in accordance with the present invention.

DETAILED DESCRIPTION

Referring to the drawing, a power supply circuit for a motherboard in accordance with an embodiment of the present invention is configured to supply power to a south bridge 500 and an input-output (I/O) controller 400. The power supply circuit for the motherboard includes a power circuit 100, a filter circuit 200, and a jumper device 300.

The jumper device 300 includes a jumper 310, and a jumper block 320. The jumper block 320 has three pins 321, 322, 323. The power circuit 100 has two power outputs, one power output supplies power to the I/O controller 400, and another power output supplies power to the south bridge 500 via the filter circuit 200. The power circuit 100 is coupled to the pin 322 of the jumper block 320 via the filter circuit 200, the pin 321 of the jumper block 320 is grounded, and the pin 323 of the jumper block 320 is idle.

The power circuit 100 includes a Schottky diode D1, a diode D2, resistors R1, R2, R3, R4, and a direct current (DC) voltage source V. The Schottky diode D1 includes a first anode A1, a second anode A2, and a cathode C. The first anode A1 of the Schottky diode D1 is respectively coupled to terminals of the resistors R1, R2, another terminal of each of the resistors R1, R2 is respectively coupled to a power supply Vcc and ground. The second anode A2 of the Schottky diode D1 is coupled to the anode of the diode D2, and is coupled to the anode of the DC voltage source V via the resistor R4. The cathode of the diode D2 is coupled to the I/O controller 400 via the resistor R3, the cathode of the DC voltage source V is grounded.

The filter circuit 200 includes capacitors C1, C2, and a resistor R5. One terminal of the capacitor C1 is coupled to the cathode C of the Schottky diode D1, the other terminal of the capacitor C1 is grounded. One terminal of the capacitor C2 is respectively coupled to the cathode C of the Schottky diode D1 and the south bridge 500 via the resistor R5, and the other terminal of the capacitor C2 is grounded. A node between the capacitor C2 and the resistor R5 is coupled to the pin 322 of the jumper block 320.

When the jumper 310 is engaged with the pins 322, 323 of the jumper block 320, the power supply circuit for the motherboard works normally. The power supply Vcc supplies power to the south bridge 500 via the resistors R1, R2, and the Schottky diode D1, and the DC voltage source V supplies power to the I/O controller 400 via the diode D2 and the resistor R3. If the jumper 310 falls off from the jumper block 320, the power supply Vcc continues to supply power to the south bridge 500. Therefore loss of CMOS information in the south bridge 500 can be avoided. If the power supply Vcc is cut off, the DC voltage source V supplies power to the south bridge 500 via the resistor R4 and the Schottky diode D1, so that the CMOS information in the south bridge 500 can be further protected. When the user wants to clear the CMOS information in the south bridge 500, the jumper 310 is moved to engage with the pins 321, 322 of the jumper block 320. The filter circuit 200 is configured for wave filtering and eliminating or reducing influence of noise signals.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A power supply circuit for motherboard, comprising:
   a Schottky diode with a first anode, a second anode, and a cathode, the cathode of the Schottky diode coupled to a south bridge;
   a first resistor with one terminal coupled to the first anode of the Schottky diode, another terminal coupled to a power supply;

a second resistor with one terminal coupled to the first anode of the Schottky diode, another terminal being grounded; and a direct current (DC) voltage source with the anode coupled to the second anode of the Schottky diode, the cathode being grounded.

2. The power supply circuit for motherboard as claimed in claim 1, further comprising a filter circuit coupled between the cathode of the Schottky diode and the south bridge, the filter circuit comprising a first capacitor, a second capacitor, and a third resistor, one terminal of the first capacitor being coupled to the cathode of the Schottky diode, the other terminal of the first capacitor being grounded, one terminal of the second capacitor being respectively coupled to the cathode of the Schottky diode and the south bridge via the third resistor, and the other terminal of the second capacitor being grounded.

3. The power supply circuit for motherboard as claimed in claim 2, further comprising a jumper device, the jumper device comprising a jumper and a jumper block, the jumper block comprising a first pin, a second pin, and a third pin, the first pin being grounded via a fourth resistor, the second pin being coupled to a node between the second capacitor and the third resistor, the third pin being idle, when the power supply circuit works normally, the jumper is slipped over the second pin and the third pin, when clearing the CMOS information in south bridge, the jumper is slipped over the first pin and the second pin.

4. The power supply circuit for motherboard as claimed in claim 1, further comprising a diode, a fifth resistor, and a sixth resistor, the second anode of the Schottky diode being coupled to the anode of the diode, and being coupled to the anode of the DC voltage source via the fifth resistor, the cathode of the diode being coupled to an input-output (I/O) controller via the sixth resistor.

5. A power supply circuit for motherboard, comprising:
a south bridge; and
a power circuit configured for supplying power to the south bridge, comprising:
a Schottky diode with a first anode, a second anode, and a cathode, the cathode of the Schottky diode coupled to the south bridge;
a first resistor with one terminal coupled to the first anode of the Schottky diode, another terminal coupled to a power supply;
a second resistor with one terminal coupled to the first anode of the Schottky diode, another terminal being grounded; and
a direct current (DC) voltage source with the anode coupled to the second anode of the Schottky diode, the cathode being grounded.

* * * * *